Oct. 9, 1962 J. L. BONANNO 3,058,016
ALTERNATING CURRENT ELECTRIC MOTOR
Filed June 13, 1958
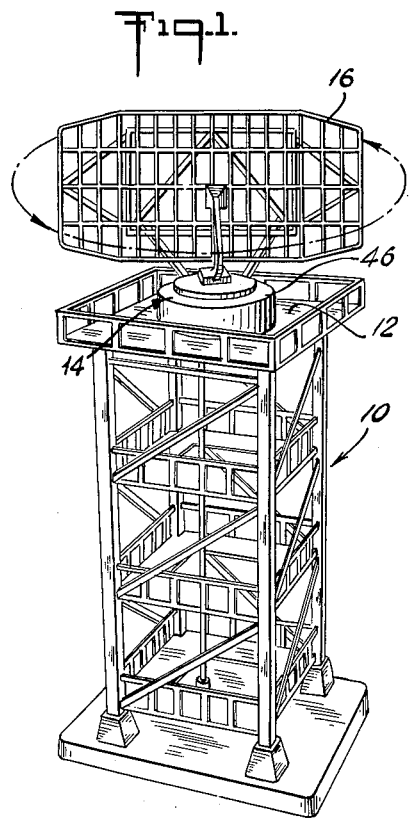
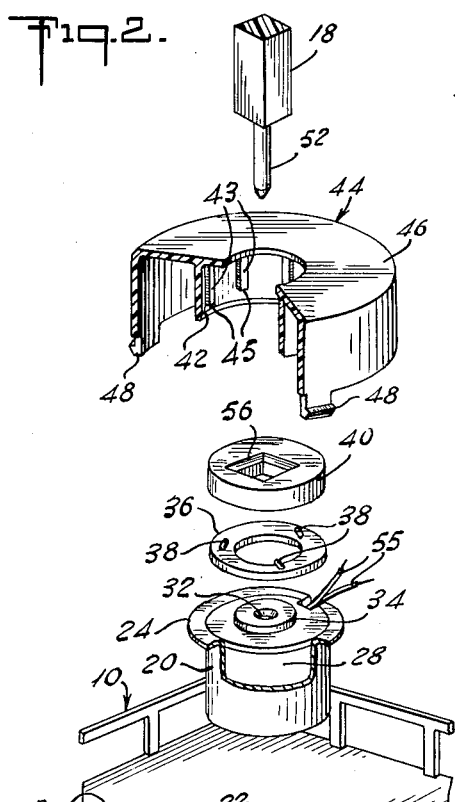
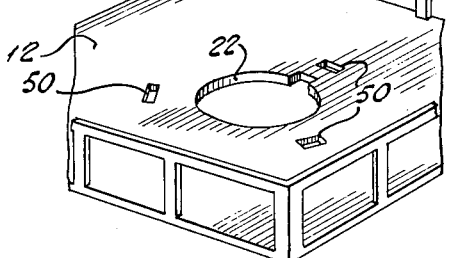
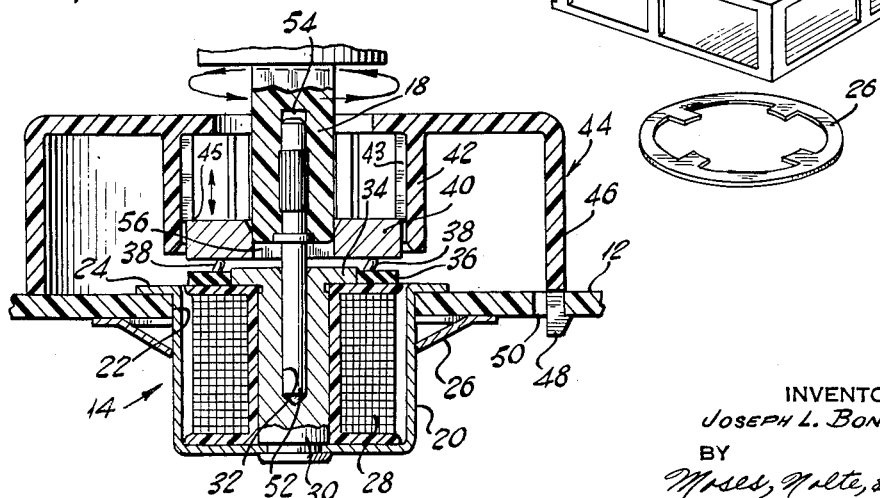
INVENTOR
JOSEPH L. BONANNO
BY
Moses, Nolte, & Nolte
ATTORNEYS 3,058,016
ALTERNATING CURRENT ELECTRIC MOTOR
Joseph L. Bonanno, South Orange, N.J., assignor to The Lionel Corporation, New York, N.Y., a corporation of New York
Filed June 13, 1958, Ser. No. 741,845
4 Claims. (Cl. 310—23)

This invention relates in general to electric motors and particularly to a new and useful small output vibrating type alternating current motor adaptable for the operation of inexpensive devices such as toys.

The present invention is an improvement over that described in Patent No. 2,759,113 issued to the present inventor on August 14, 1956, particularly in respect to the provision for transmitting rotative movement to apparatus without also vibrating the apparatus.

The present invention includes a construction in which substantially all of the energy used to vibrate the driving member is utilized to produce rotation rather than for supporting and vibrating the part to be rotated.

Accordingly, it is an object of the present invention to provide an improved vibrating type alternating current electric motor.

A further object of the invention is to provide an alternating current electric motor which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIGURE 1 is a perspective view of a toy radar tower using a vibrating type electric motor constructed in accordance with the invention;

FIGURE 2 is an exploded perspective view indicating the radar tower mounting platform and the details of the electric motor constructed in accordance with the invention; and FIGURE 3 is a transverse section of the electric motor constructed in accordance with the invention.

Referring to the drawings in detail, the invention, as embodied therein, includes a radar tower generally designated 10 having a top platform 12 on which is mounted an electric vibrating type motor generally designated 14. A radar antenna 16 is rigidly affixed to a rectangular driving shaft 18 which is rotated by the electric motor 14.

In accordance with the invention the electric motor 14 includes a cup shaped solenoid coil housing 20 which is positioned within a circular opening 22 in the top platform 12 with an annular flange 24 thereof resting on the platform. The cup shaped member is held in place on the tower 10, by a lockwasher 26 which is positioned over the bottom of the housing 20 against the underside of the platform 12.

An annular electromagnetic coil 28 is positioned within the cup shaped housing 20 and is provided with a central core 30 having a cylindrical slot 32 extending downwardly from the top face thereof. The core 30 is provided with an annular top flange 34 which is positioned against the top face of the coil 28.

In accordance with the invention a ring-shaped resilient member 36 is positioned around the flange 34 and is provided with a plurality of upstanding resilient pieces 38. The upstanding resilient pieces 38 are slanted in the same circumferential direction and located in spaced position around the ring-shaped resilient member 36. The ring-shaped resilient member 36 is made to an internal diameter slightly larger than the external diameter of the flange 34 and is tightly fitted therearound to prevent its rotational movement.

An armature ring 40 rests on the upstanding resilient pieces 38 and is confined in its location thereover by an internal cylindrical wall 42 of a cover piece generally designated 44. The cover piece 44 includes a plurality of internal ribs 43 including bottom faces 45 which limit the upward movement of the armature ring 40. The ribs 43 confine the armature to very slight vibratory reciprocable movement and translates this movement into rotation of the armature 40. The cover piece 44 includes an outer cylindrical wall 46 spaced from the wall 42 and provided with three evenly spaced depending latching feet 48, which fit into rectangular slots 50 cut into the top platform 12.

A spindle 52 is splined at its top end and fitted into a complementary splined cylindrical slot 54 on the bottom of the driving shaft 18 for rotation therewith. In accordance with the invention the spindle 52 supports the weight of the object to be rotated independently of the mechanism for rotating the part and hence the power of the motor is used solely for rotation and not for support of the part rotated.

The solenoid coil 28 is actuated electrically through a set of terminal wires 55 from a suitable source of alternating electric current.

The armature ring 40 is provided with a rectangular center opening 56 which permits the easy reciprocation of the ring 40 along the shaft 18 within the confinement of the wall 42. When the solenoid 28 is actuated electrically the armature 40 is intermittently attracted to the coil 28, in response to the phasing of the alternating current supplied. This results in the armature ring 40 being intermittently brought into engagement with the upstanding resilient pieces 38 and since these are all slanted in the same circumferential direction rotation is imparted to the armature ring.

Since the ring 40 may move freely up and down on the driving shaft 18 within the limits of the bottom faces 45 of the ribs 43, the vibration of the ring is not transmitted to the shaft. Rotation of the armature ring will cause an even non-vibrating rotation of the shaft 18 and the radar antenna 16. Since the shaft 18 is not vibrated by the solenoid it may carry heavy objects thereon for rotation, all of the weight being borne by the core 30. None of the power required to vibrate the armature 40 is wasted by vibrating the shaft 18.

While a specific embodiment of the invention has been shown and described in detail to illustrate the application of the invention principles, it will be understood that the invention may be embodied otherwise without departing from such principles.

I claim:

1. An electric motor comprising a coil, a magnetizable core in the coil, a member including a plurality of upstanding resilient portions all slanted in the circumferential direction and extending outwardly from a face of the magnetizable core, an armature resting on said upstanding members and capable of reciprocable movement with respect thereto, a driven shaft substantially coaxial with the central axis of said armature, means slidably connecting said shaft to said armature for rotation therewith while permitting relative reciprocation between said shaft and said armature, such that the reciprocating movements of said armature are not coupled to said shaft, and means to electrically energize said coil to impart a turning movement to said armature and said driven shaft.

2. In an electric motor comprising a coil, a magnetizable core in the coil having an exposed face, an armature positioned in proximity to said face and a plurality of upstanding resilient members inclined in a common direction and positioned between said armature and said face, the improvement comprising means mounting said armature above said resilient members to permit axial and rotary movement of said armature with respect to said coil in response to alternate current impulses applied thereto, said armature having a recess therein, and a driven shaft substantially coaxial with the recess in said armature, said shaft including means slidably engaging said recess to allow reciprocal movement of said armature with respect to said shaft, such that the reciprocating movements of said armature are not coupled to said shaft, said shaft including a portion pivotal on said core for rotation of said shaft thereon.

3. An electric motor according to claim 2 wherein said core is provided with a hollow cylindrical portion and including a rod connected to said shaft and extending into said hollow portion of said core for rotation therein.

4. An electric rotator comprising a coil, a magnetizable core in said coil, means for energizing said coil, resilient means adjacent said core including portions slanted in a common circumferential direction, a rotatable armature resting on said resilient means and confined for rotation thereabove, a shaft connected to said armature for rotation thereby and means for preventing the vibration of said shaft so that vibrations produced in said armature by the energization of said coil will not be transmitted to said shaft but the rotative movement thereof will be.

References Cited in the file of this patent

UNITED STATES PATENTS

| | | |
|---|---|---|
| 1,836,748 | Carleg | Dec. 15, 1931 |
| 2,481,686 | Roggenstein | Sept. 13, 1949 |
| 2,512,682 | Salinger et al. | June 27, 1950 |
| 2,583,747 | Potter | Jan. 29, 1952 |
| 2,656,474 | Rohden | Oct. 20, 1953 |
| 2,759,113 | Bonanno | Aug. 14, 1956 |
| 2,860,447 | Muller et al. | Nov. 18, 1958 |
| 2,958,791 | Shnitzler | Nov. 1, 1960 |

FOREIGN PATENTS

| | | |
|---|---|---|
| 575,386 | Germany | Jan. 14, 1931 |
| 326,900 | Italy | June 26, 1935 |